United States Patent Office 3,553,200
Patented Jan. 5, 1971

3,553,200
AZABICYCLOALKYL-PROPIOPHENONES
Robert Bruce Moffett, Kalamazoo, Mich., assignor to The Upjohn Company, Kalamazoo, Mich., a corporation of Delaware
No Drawing. Filed July 25, 1968, Ser. No. 747,450
Int. Cl. C07d
U.S. Cl. 260—239
2 Claims

ABSTRACT OF THE DISCLOSURE

This invention relates to novel 2-phenyl-3-(3-azabicyclo[3.2.2]nonan-3-yl)-propiophenones and their 2 - azabicyclo[2.2.2]octan-2-yl counterparts; it is inclusive of the free base and acid addition salt forms of the compounds embraced by the formula

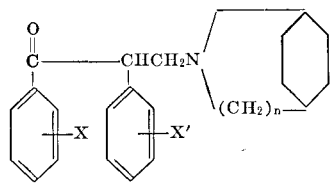

I wherein $n$ is selected from the group consisting of zero and one and X and X' are selected from the group consisting of hydrogen, lower-alkyl, fluorine, chlorine and bromine.

As used in this specification, the term "lower-alkyl" means alkyl of from one through four carbon atoms, e.g., methyl, ethyl, propyl, butyl, and isomeric forms thereof.

CROSS REFERENCE TO RELATED APPLICATIONS

Ser. No. 747,427 filed of even date covering novel 2-phenyl-3-tertiaryamino-1-(2-thienyl)-1-propanones.
Ser. No. 747,482 filed of even date covering 2-phenyl-3-(1-azaspiro[4.5]dec-1-yl)-propiophenones.
Ser. No. 747,426 filed of even date covering 2-phenyl-3-(3-quinuclidinylamino)-propiophenones.
Ser. No. 747,425 filed of even date covering 2-phenyl-3-(4-hydroxy-4-phenylpiperidino)-propiophenones.
Ser. No. 747,483 filed of even date covering 2-phenyl-3-(3-pyrrolin-1-yl)-propiophenones.

BRIEF SUMMARY OF THE INVENTION

The novel compounds embraced by Formula I exist either in the non-protonated (free base) form or in the protonated (acid addition salt) form, depending on the pH of the environment. They form stable protonates, i.e., acid addition salts, on neutralization of the free base with suitable acids, for example, hydrochloric, hydrobromic, sulfuric, phosphoric, nitric, acetic, benzoic, salicylic glycolic, succinic, nicotinic, tartaric, maleic, malic, pamoic, methanesulfonic, cyclohexanesulfamic, picric and lactic acids and the like.

The novel 2 - phenyl - 3-(3-azabicyclo[3.2.2]nonan-3-yl)-propiophenones and their 2-azabicyclo[2.2.2]octan-2-yl counterparts of Formula I are prepared by mixing a corresponding 2-phenylacrylophenone of the formula

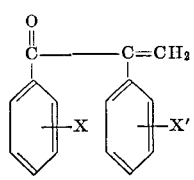

(II)

wherein X and X' have the same meaning as above, with an appropriate secondary amine of the formula

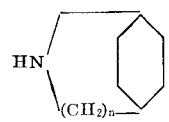

(III)

wherein $n$ has the significance defined above.

2-phenylacrylophenones (II) are known in the art, and can be prepared in the manner described in Bull. Soc. Chem. Soc. 80, 2733 (1958).

The secondary amines of Formula III are known in the art and can be prepared by published methods; for example, 3-azabicyclo[3.2.2]nonane can be produced in accordance with the procedure described in Ind. Eng. Chem., Prod. Res. Develop. 4, 40 (1965), and 2-azabicyclo[2.2.2]octane can be prepared in the manner set forth in J. Amer. Chem. Soc. 80, 2733 (1958).

In carrying out the reaction between the acrylophenones (II) and the azabicyclo compounds (III), the two reactants are merely mixed. Inert solvents can be employed, if desired. Heating of the reaction mixture is not necessary. The molecular ratio of the compounds of Formula II and Formula III can be varied, substantially equimolar ratios having been found satisfactory. The time required for the completion of the reaction depends upon such factors as the particular reactants, their solubility, their relative amounts, thoroughness of mixing, and the like. Therefore, it will be understood that the optimum reaction time will vary for each set of reaction conditions. Ordinarily, reaction times ranging from about several minutes to about several hours are suitable. After completion of the reaction between the compounds of Formula II and Formula III, the product (I) is isolated from the reaction mixture in its free base form, using conventional procedures such as filtration, solvent evaporation, solvent extraction, chromatography or crystallization, or a combination of these methods. The free bases so obtained can be purified, e.g., by recrystallization from a solvent or suitable mixture of solvents. The free base form can be converted to any acid addition salt by neutralization with an acid, e.g., any of those given above.

The compounds of Formula I possess anti-fungal properties. Illustratively, they inhibit the growth of the pathogen *Alternaria solani* in plants. They also stimulate the central nervous system in mammals and animals, e.g., mice, rats and birds; they antagonize convulsions and prevent death resulting from the administration of nicotine to mice.

DETAILED DESCRIPTION

It is to be understood that the invention is not to be limited to the exact details of operation or exact compositions shown and described herein, as obvious modifications and equivalents will be apparent to those skilled in the art, and the invention is therefore to be limited only by the scope of the appended claims.

PREPARATION 1

*2-phenylacrylophenone (or 1,2-diphenyl-2-propen-1-one) (II)*

A solution of 294 g. (1.5 moles) of phenyl benzyl ketone (also known as desoxybenzoin), 360 ml. of 37% formaldehyde, and 7.5 ml. of piperidine in 1.35 l. of methanol in a 5 l. flask is stirred under reflux for about 3 hours and allowed to stand for about 16 hours. The mixture is diluted with 2 l. of water and the resulting oil extracted with 2 l. of ether in 2 portions. The ether solutions are washed successively with 150 ml. of aqueous 5% hydrochloric acid solution, 200 ml. of 5% aqueous sodium bicarbonate solution, 300 ml. of water, saturated aqueous sodium chloride solution, and dried over sodium sulfate. After filtration, the solvent is evaporated and the resulting syrup distilled from a Claisen flask to give 266.6 g. (85% yield) of 2-phenylacrylophenone (II) as a colorless oil having a boiling point of 205 to 207° C. (at 15 mm. of Hg). This material crystallizes and is stable at 0° C.

Following the procedure of Preparation 1, but substituting for phenyl benzyl ketone the following:

(1) phenyl p-chlorobenzyl ketone,
(2) p-bromophenyl p-bromobenzyl ketone,
(3) m-chlorophenyl m-chlorobenzyl ketone,
(4) p-fluorophenyl benzyl ketone,
(5) p-chlorophenyl p-methylbenzyl ketone,
(6) o-propylphenyl o-bromobenzyl ketone,
(7) o-bromophenyl m-ethylbenzyl ketone,
(8) m-fluorophenyl p-butylbenzyl ketone,
(9) p-methylphenyl p-methylbenzyl ketone,
(10) o-butylphenyl p-butylbenzyl ketone, etc., there can be prepared, respectively, (1) 2-(p-chlorophenyl)acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc.

Example 1

2-phenyl-3-(3-azabicyclo[3.2.2]nonan-3-yl)-propiophenone (I)

A mixture of 31.2 g. (0.15 mole) of distilled 2-phenylacrylophenone (II) and 18.8 g. (0.15 mole) of 3-azabicyclo[3.2.2]nonane (III) becomes warm, although not completely in solution. The mixture is dissolved in 300 ml. of absolute ethanol, filtered hot and cooled to give 42.2 g. (84.5% yield) of light tan crystals of 2-phenyl-3-(3-azabicyclo[3.2.2]nonan-3-yl)-propiophenone (I), having a melting point of 113 to 115° C.

Analysis.—Calcd. for $C_{23}H_{27}NO$ (percent): C, 82.84; H, 8.16; N, 4.20. Found (percent): C, 83.09; H, 8.24; N, 4.46.

Infrared and nuclear magnetic resonance (NMR) spectra support the proposed structure of the thus produced compound.

By addition of a diethyl ether solution of hydrogen chloride, hydrogen bromide, sulfuric acid, phosphoric acid, acetic acid, benzoic acid, salicylic acid, citric acid, succinic acid, malic acid, cyclohexanesulfamic acid, or trihloroacetic acid, etc. to an ethanol solution of 2-phenyl-3-(3-azabicyclo[3.2.2]nonan-3-yl)-propiophenone (I) (or any of the compounds of Formula I shown in the next paragraph), followed by the addition of about four volumes of diethyl ether, the corresponding acid addition salt can be prepared.

Following the procedure of Example 1, but substituting for 2-phenylacrylophenone (II) the following:

(1) 2-p-chlorophenyl-acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II)
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc., there can be prepared, respectively, (1) 2-(p-chlorophenyl)-3-(3-azabicyclo[3.2.2]nonan-3-yl)-propiophenone (I),
(2) 2-(p-bromophenyl)-3-(3-azabicyclo[3.2.2]nonan-3-yl)-4'-bromopropiophenone (I),
(3) 2-(m-chlorophenyl)-3-(3-azabicyclo[3.2.2]nonan-3-yl)-3'-chloropropiophenone (I),
(4) 2-phenyl-3-(3-azabicyclo[3.2.2]nonan-3-yl)-4'-fluoropropiophenone (I),
(5) 2-(p-methylphenyl)-3-(3-azabicyclo[3.2.2]nonan-3-yl)-4'-chloropropiophenone (I),
(6) 2-(o-bromophenyl)-3-(3-azabicyclo[3.2.2]nonan-3-yl)-2'-propylpropiophenone (I),
(7) 2-(m-ethylphenyl)-3-(3-azabicyclo[3.2.2]nonan-3-yl)-2'-bromopropiophenone (I),
(8) 2-(p-butylphenyl)-3-(3-azabicyclo[3.2.2]nonan-3-yl)-3'-fluoropropiophenone (I),
(9) 2-(p-methylphenyl)-3-(3-azabicyclo[3.2.2]nonan-3-yl)-4'-methylpropiophenone (I),
(10) 2-(p-butylphenyl)-3-(3-azabicyclo[3.2.2]nonan-3-yl)-2'-butylpropiophenone (I), etc.

2-phenyl-3-(2-azabicyclo[2.2.2]octan-2-yl) propiophenone (I)

Following the procedure of Example 1, but substituting 2-azabicyclo[2.2.2]octane (III) for 3-azabicyclo[3.2.2]nonane (III), 2-phenyl-3-(2-azabicyclo[2.2.2.]octan-2-yl)-propiophenone (I) can be prepared.

Following the procedures of Examples 1, 2 and the paragraph immediately preceding Example 2, but substituting for 2-phenylacrylophenone (II) the following:

(1) 2-p-chlorophenyl-acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc., there can be prepared, respectively, (1) 2-(p-chlorophenyl)-3-(2-azabicyclo[2.2.2]octan-2-yl)-propiophenone (I),
(2) 2-(p-bromophenyl)-3-(2-azabicyclo[2.2.2]octan-2-yl)-4'-bromopropiophenone (I),
(3) 2-(m-chlorophenyl)-3-(2-azabicyclo[2.2.2]octan-2-yl)-3'-chloropropiophenone (I),
(4) 2-phenyl-3-(2-azabicyclo[2.2.2]octan-2-yl)-4'-fluoropropiophenone (I),
(5) 2-(p-methylphenyl)-3-(2-azabicyclo[2.2.2]octan-2-yl)-4'-chloropropiophenone (I),
(6) 2-(o-bromophenyl)-3-(2-azabicyclo[2.2.2]octan-2-yl)-2'-propylpropiophenone (I),
(7) 2-(m-ethylphenyl)-3-(2-azabicyclo[2.2.2]octan-2-yl)-2'-bromopropiophenone (I),
(8) 2-(p-butylphenyl)-3-(2-azabicyclo[2.2.2]octan-2-yl)-3'-fluoropropiophenone (I),
(9) 2-(p-methylphenyl)-3-(2-azabicyclo[2.2.2]-2-yl)-4'-methylpropiophenone (I),
(10) 2-(p-butylphenyl)-3-(2-azabicyclo[2.2.2]-2-yl)-2'-butylpropiophenone (I), etc.

The compounds prepared in the immediately preceding paragraph and in Eample 2 can be converted to their acid addition salts by following a procedure corresponding to the one set forth in the paragraph following Example 1.

Modes of administration and dosages of the products of Formula I of this invention for use as a central nervous system stimulants are analogous to those disclosed in U.S. Pat. 3,203,962.

What is claimed is:

1. A compound selected from the group consisting of (1) a compound of the formula

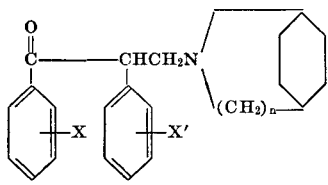

wherein $n$ is selected from the group consisting of zero and one and X and X' are selected from the group consisting of hydrogen, lower-alkyl, fluorine, chlorine and bromine, and (2) an acid addition salt thereof.

2. A compound of claim 1 wherein $n$ is one and X and X' are hydrogen, namely, 2-phenyl-3-(3-azabicyclo[3.2.2]nonan-3-yl)-propiophenone.

References Cited

UNITED STATES PATENTS

| | | | |
|---|---|---|---|
| 3,318,875 | 5/1967 | Nobles | 260—239 |
| 3,328,390 | 6/1967 | Grogan | 260—239 |

ALTON D. ROLLINS, Primary Examiner